United States Patent [19]

Eis et al.

[11] 4,278,541
[45] Jul. 14, 1981

[54] SEPARATOR EMPLOYING AN ANNULAR VERTICAL FEEDWELL WITH ASSOCIATED CONCENTRIC ANNULAR BAFFLE PLATE AND METHOD OF USING SAME TO SEPARATE SOLIDS FROM LIQUIDS

[75] Inventors: Frederick G. Eis, San Ramon; Oren V. Bonney; Willard A. Sackett, both of Woodland, all of Calif.

[73] Assignee: Amstar Corporation, New York, N.Y.

[21] Appl. No.: 90,638

[22] Filed: Nov. 2, 1979

Related U.S. Application Data

[63] Continuation of Ser. No. 886,418, Mar. 14, 1978, abandoned.

[51] Int. Cl.³ .............................................. B01D 21/08
[52] U.S. Cl. .................................. 210/112; 210/208; 210/519; 210/528
[58] Field of Search .................. 210/20, 40 R, 49, 60, 210/61, 83, 84, 95, 96 R, 97, 104, 112, 207, 208, 519, 520, 195 S, 197, 525, 528, 534, 535

[56] References Cited

U.S. PATENT DOCUMENTS

| 2,140,059 | 12/1938 | Simonsen | 210/519 |
|---|---|---|---|
| 2,285,893 | 6/1942 | Boosey | 210/519 |
| 2,429,316 | 10/1947 | Green | 210/42 R |
| 3,152,071 | 10/1964 | Kraft | 210/208 |
| 3,236,384 | 2/1966 | Sontheimer et al. | 210/208 |
| 3,246,762 | 4/1966 | Sontheimer | 210/208 |
| 3,443,692 | 5/1969 | Halsey | 210/97 |
| 3,473,665 | 10/1969 | Duff | 210/519 |
| 3,487,017 | 12/1969 | Thorn et al. | 210/208 |
| 3,523,889 | 11/1970 | Eis | 210/112 |
| 4,038,186 | 7/1977 | Potter | 210/519 |
| 4,054,514 | 10/1977 | Oltman | 210/20 |
| 4,055,494 | 10/1977 | Emmett | 210/519 |

FOREIGN PATENT DOCUMENTS

| 421865 | 2/1972 | Australia | 210/519 |
|---|---|---|---|
| 546086 | 9/1957 | Canada | 210/519 |
| 2102646 | 1/1971 | Fed. Rep. of Germany | 210/519 |
| 925993 | 1/1960 | United Kingdom | 210/519 |
| 1419495 | 12/1975 | United Kingdom | 210/519 |

*Primary Examiner*—Ernest G. Therkorn
*Attorney, Agent, or Firm*—Cooper, Dunham, Clark, Griffin & Moran

[57] ABSTRACT

A sedimentation apparatus or clarifier or thickener is advantageously provided with an annular feedwell and associated annular concentric baffle plate to better enable suspended solid materials to be separated from liquids at high throughputs.

11 Claims, 6 Drawing Figures

SEPARATOR EMPLOYING AN ANNULAR VERTICAL FEEDWELL WITH ASSOCIATED CONCENTRIC ANNULAR BAFFLE PLATE AND METHOD OF USING SAME TO SEPARATE SOLIDS FROM LIQUIDS

This is a continuation of application Ser. No. 886,418 filed Mar. 14, 1978, now abandoned.

BACKGROUND OF THE INVENTION

There has long been an interest in apparatus useful in the separation of solid materials from liquids in which the solid materials are suspended. Such apparatus have applications in diverse fields, such as the handling of commercial and municipal wastes, beet sugar manufacture, coal and uranium mining, phosphate rock processing and the like.

U.S. Pat. No. 3,523,889 describes one such apparatus for rapidly and continuously separating suspended solid materials from liquids. The apparatus described was a marked departure from the prior art in that it involved the introduction of liquid influent feed containing freshly agglomerating solids at a location near the bottom of the separating tank or apparatus and below the level of previously agglomerated solids. By means of this apparatus, a dynamic sludge bed was created in which particles after being dispersed radially outward collide with other agglomerated particles to cause still further agglomeration and settling. This brought about substantial improvement in the throughput of solid materials to be recovered.

In spite of the improved results obtained with the apparatus of U.S. Pat. No. 3,523,889, there is a theoretical limit for a given unit or apparatus on the throughput and recovery of solids. In order to increase throughput larger and larger units have been built. The erection and operation of large units have created problems in the realization of expected increased throughput. Efforts have been made to introduce the influent feed at more than one point within the tank. These efforts led to various feedwell structures, including annular feedwells, such as the one disclosed in Australian Pat. No. 421,865.

This patent describes a sedimentation apparatus having an annular feedwell through which liquid feed containing suspended solids is carried to an upper portion of the tank above the level of previously settled solids. Upon leaving the feedwell, influent feed strikes downwardly-angled deflecting plates and is dispersed within the tank.

In the present invention, it has been found that by using an annular feedwell which delivers influent feed to a position near the bottom of a settling tank, at which position the influent feed is deflected radially outward and inward by a substantially horizontal concentric annular baffle, it is possible to maintain a substantially uniform dynamic sludge bed in settling tanks of large diameter and to achieve a high throughput of solids per unit area of settling tank. It has also been found that by using an annular feedwell with associated planar horizontal baffle plate it is possible to effect a more even distribution of feed and solids to be settled throughout the tank.

SUMMARY OF THE INVENTION

The present invention is directed to a sedimentation apparatus useful for rapidly and continuously separating suspended solids from liquid at a predetermined and controlled rate.

The apparatus of this invention comprises a tank structure, typically a cylindrical tank, which has a top outlet means for removal of a clarified liquid and a bottom outlet means from which settled solids can be withdrawn. Influent liquid feed containing suspended solids is introduced into the tank by a suitable influent means, such as a pipe, which is connected to an annular feedwell. The feedwell extends vertically downwardly within the tank to a position substantially nearer the bottom than the top.

During passage of the influent liquid feed through the feed pipe, agglomerating agent, e.g. an anionic polyelectrolyte, such as a polyacrylamide, is added to the influent liquid feed. The net effect of the addition of the agglomerating agent is to initiate the fresh formation of agglomerates of the solids in the influent liquid feed before the feed enters the annular feedwell. If desired, however, agglomerating agent may be added to the influent feed in the annular feedwell.

The influent liquid feed containing freshly agglomerating solid materials is introduced into the annular feedwell through the influent pipe and passes through the feedwell to a position of entry or discharge within the tank structure. Closely adjacent to the bottom discharge or opening of the annular feedwell a substantially horizontal planar annular baffle plate which is concentric with the annular feedwell is positioned. The baffle plate is dimensioned to substantially fit or to have the same shape and size of the bottom discharge opening of the annular feedwell. The baffle plate arrests and diverts the flow of influent solids-containing liquid feed so that the feed is directed radially inward and outward within the tank through the opening defined by the bottom of the annular feedwell and the matching baffle plate.

The clarifier or thickener apparatus of this invention also includes means for controlling the rate of discharge of solid materials through the bottom outlet means in order to establish and maintain the level of previously settled solids above the position of entry of influent feed. The apparatus is also provided with means for withdrawing clarified liquid through the top outlet means.

In accordance with one embodiment of the invention, the influent feed means is positioned near the top of the apparatus and the annular feedwell extends concentrically vertically downward within a cylindrical settling tank.

In accordance with another embodiment, the apparatus is provided with vertically slidably adjustable sleeves, such as right angles or flanges, attached to the bottom of the annular feedwell at the position where the influent liquid feed enters the tank. These adjustable sleeves function to define the opening through which the feed passes radially inward and outward into the tank before being dispersed so as to alter its velocity and improve the likelihood that additional agglomeration will occur within the tank. In this way the throughput and recovery of solids can be increased.

The apparatus is provided with a rotatable rake or arm for collecting agglomerated and settled solids and conducting such settled solids to the bottom outlet means for discharge and recovery. Desirably, the annular baffle plate is attached or fixed to the top of the rotatable rake or raking means.

It is therefore a general object of the present invention to provide an improved apparatus for the settling and removal of suspended solids from liquids, the apparatus enabling high throughputs for a settling tank of large diameter.

It is also a general object of the present invention to provide apparatus for an improved process for the settling and removal of suspended solids from liquids which process is highly efficient and permits high throughputs per unit area of settling tank.

This invention will be better understood from the following detailed description made with reference to the accompanying drawings.

BRIEF DESCRIPTION OF THE DRAWINGS

FIG. 2 is a partial sectional view along the line 2—2 of FIG. 1.

DETAILED DESCRIPTION OF THE INVENTION

Figure 1:
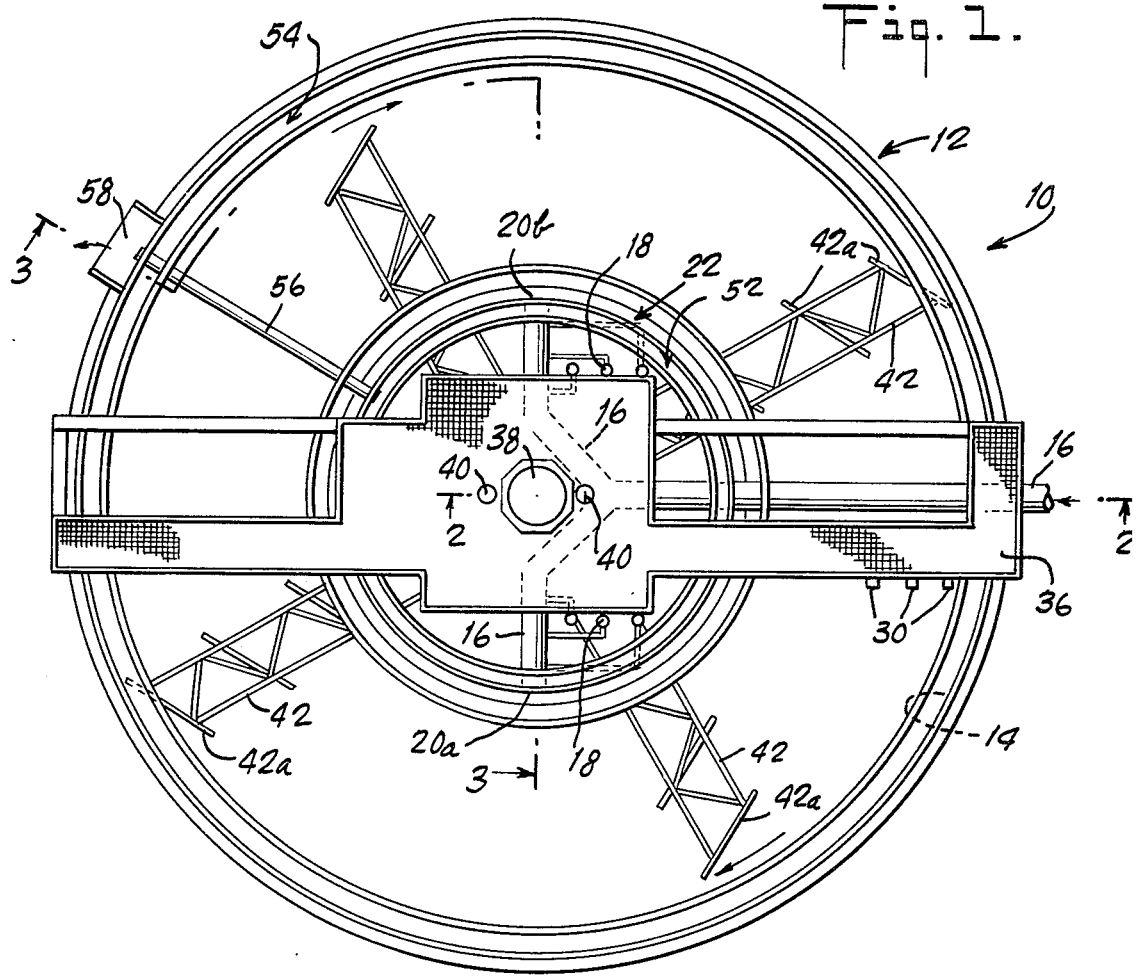
FIG. 1 is a top plan view of a thickener or clarifier apparatus in accordance with this invention.

Referring to the drawings, FIG. 1 is a top plan view of sedimentation apparatus 10 in accordance with this invention. Apparatus 10 comprises a container or tank structure 12 shown as cylindrical in design. Wall 14 of the tank structure serves to contain the liquid and suspended solids undergoing treatment. Influent liquid feed containing suspended solids, e.g. aqueous liquids containing coal, uranium ore or other suspended solids, organic and/or inorganic, is introduced into apparatus 10 through a suitable influent means, such as pipe 16, shown here as positioned at or near the top of apparatus 10. During passage through the pipe, an agglomerating agent, e.g. an anionic polyelectrolyte, such as a polyacrylamide, is desirably added to the liquid influent feed by suitable means, such as feedlines 18 positioned in fluid communication with influent feed pipe 16. The purpose of the addition of the agglomerating agent is to initiate the formation of agglomerates of the solids in the influent feed. The influent liquid feed, now containing freshly agglomerating solid materials, is led via feed pipe 16 into vertical annular feedwell 22. In the embodiment shown, influent pipe 16 is Y-branched and has two outlets 20a and 20b and annular feedwell 22 extends vertically downward within tank 12. Alternatively, it is possible to add agglomerating agent prior to passage of the liquid influent feed through influent pipe 16 and/or after the influent feed has entered feedwell 22.

As shown in FIG. 2, the influent feed, upon entry into annular feedwell 22, passes to the bottom of feedwell 22 to a position from which it enters the tank, namely, the open bottom of feedwell 22. This position of entry of the influent feed from the feedwell is substantially nearer the bottom of tank 12 than the top. At the open bottom of feedwell 22 there is closely positioned annular baffle plate 24, concentric with annular feedwell 22. Baffle plate 24 is planar and substantially horizontally positioned parallel to and commensurate in size to but spaced from the open bottom of feedwell 22. Baffle plate 24 serves to arrest and divert the flow of influent solids-containing liquid feed so that the influent feed is directed radially inward and outward within tank 12 but without significant agitation of the dynamic mass of agglomerated solids at about the bottom or lower portion of tank 14. As solid particles or agglomerates are deflected radially inward and outward they collide with other particles and agglomerates in the mass of agglomerated solids whereby further agglomeration is promoted. Because the radial movement of the particles is both inward and outward, greater and more efficient utilization of the settling tank is achieved and more uniform distribution of agglomerated and/or settled solids result.

Figure 4:
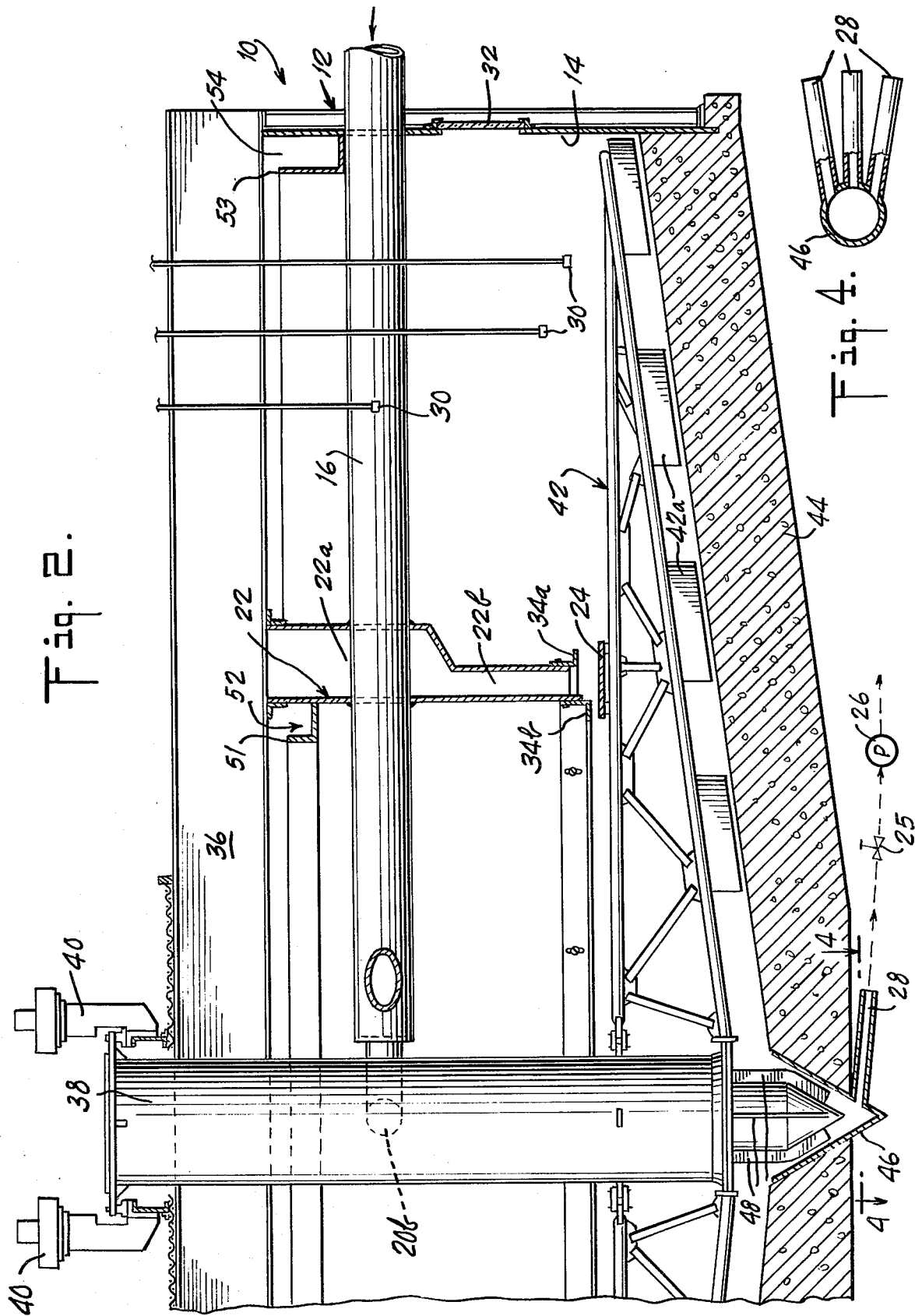
FIG. 4 is a sectional view along the line 4—4 of FIG. 2.

Referring now to FIG. 2, the apparatus is provided with solids discharge means, such as valve 25 and discharge pump 26, for controlling the rate of discharge of segregated and collected solid materials through bottom outlet means 28, such as the three-channeled pipe shown more particularly in FIG. 4.

During operation of the apparatus of this invention it is essential that the level of previously settled solids, i.e. interface 50, between the clarified liquid and the relatively dense, dynamic phase of agglomerated solids be maintained above the position where influent feed enters tank 10 from annular feedwell 22. In order to establish and maintain the desired level of previously settled solids, i.e. dense fluent mass of agglomerated solids, apparatus 10 is provided with sensing means 30, such as mechanical sensors or photoelectric sensors, for determining the level of the settled, dense solids phase and for activating valve 25 and discharge pump 26 through suitable electric circuitry (not shown). Settled agglomerated solids are removed at a rate such that the interface or top level of previously settled solids is maintained above the position where the influent feed containing agglomerating agent enters tank 12 via feedwell 22 for agglomeration, settling and removal.

The clarifier or thickener apparatus 10 of this invention is shown provided with viewing window 32 to permit visual monitoring of the level of the interface between settled solids and clarified liquid. Viewing window 32 can also be used, as indicated hereinabove, in connection with photoelectric sensors and an external light source (not shown) to create a system for activating the valve and discharge pump.

Also, as shown in FIG. 2, annular feedwell 22 is larger in cross-section at upper portion 22a closer to influent pipe 16 and smaller in cross-section at lower portion 22b closer to the bottom of feedwell 22 and the point of entry of the solids-containing influent feed into tank 12. At the location of entry of the influent feed from annular feedwell 22 into tank 12, annular feedwell 22 has attached to both its inner and outer edges upwardly or downwardly slidably adjustable sleeves, angles or flanges 34a and 34b which, in combination with baffle plate 24, define the opening or space between baffle plate 24 and the bottom of feedwell 22 and function to further increase or decrease and adjust or alter the flow and velocity of influent feed into tank 12 as the influent feed is discharged from the bottom of feedwell 22 radially inward and outward within the tank. Control of solids agglomeration within tank 12 is thereby effected and increased throughput is achieved.

Annular feedwell 22 is conveniently attached to bridge structure 36 which also supports central vertical rotatable column 38 which is caused to rotate by an appropriate driving means, such as motors and gears 40. Attached at the lower portion of vertical rotatable column 38 are rotatable raking or stirring-moving means 42, such as rakes. On the bottom of means 42 blades 42a are fixed and positioned to be closely adjacent to bottom 44 of tank 14. Rake blades 42a function to gather the settled solids and conduct settled solids along bottom 44 of tank 14 to outlet means 28. Bottom 44 of the tank is made of an appropriate material, such as a metal, e.g. steel or concrete or asphalt. Settled solids are removed at a rate such that the level of the relatively dense, dynamic settled solids phase is maintained above the position where the influent feed enters the tank. As illustrated, settled solids are first gathered and conducted along bottom 44 of tank 14 by rake 42 and rake blades 42a to a collector or sump 46, such as a conical sump. Within sump 46 settled solids are directed downward to the outlet means 28 by scraper blades 48 attached to the lowermost portion of rotatable vertical column 38. As shown more particularly in FIG. 4, the outlet means 28 comprises a three-channeled pipe leading from sump 46. Annular baffle plate 24 is conveniently attached to the top of rake 42.

Figure 3:
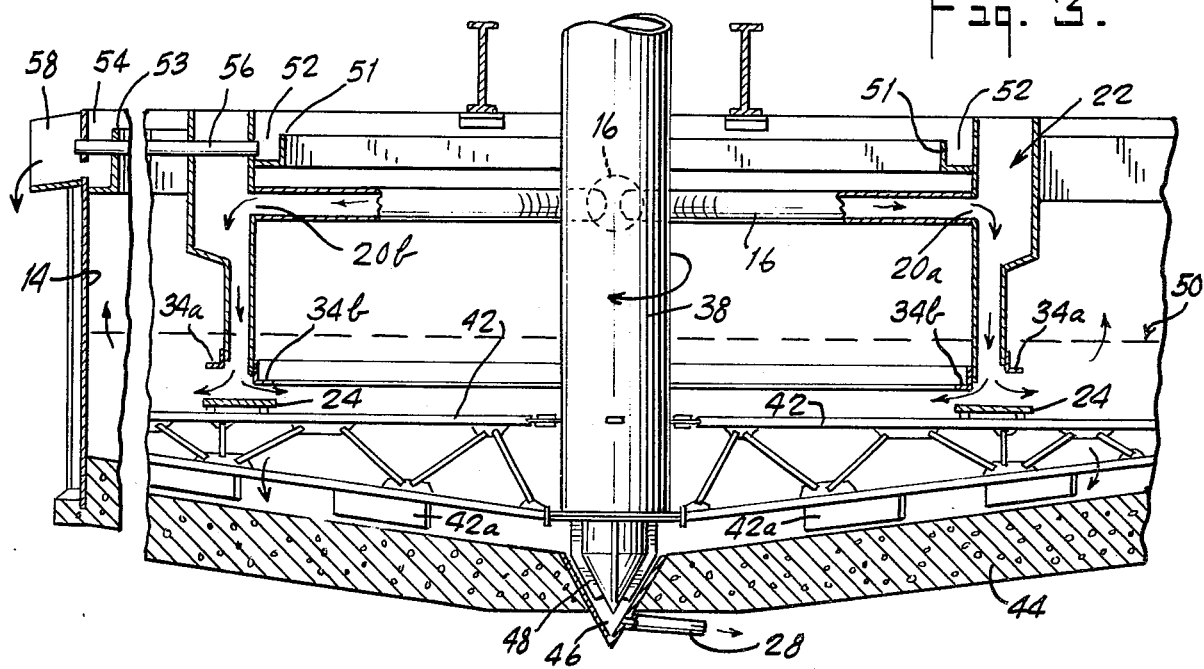
FIG. 3 is a partial sectional view along the line 3—3 of FIG. 1.

The direction and movement of the suspended solids-containing influent feed within apparatus 10 of this invention is indicated in FIG. 3. Feed enters apparatus 10 through pipe 16 and is directed to outlets 20a and 20b. The influent liquid feed then enters annular feedwell 22 and passes vertically downward to a position of entry into the tank below the upper level 50 of the relatively dense settled solids phase. The flow of the influent liquid feed is directed radially inward and outward by means of concentric annular baffle plate 24 as the feed exits the bottom of annular feedwell 22. Annular sleeves 34a and 34b which are slidably adjustable up and down in combination with baffle plate 24 which is fixed define the opening at the bottom of feedwell 22 available for the feed to flow or move into tank 14 radially outwardly and inwardly.

As the solids material in the influent feed agglomerates and settles to the bottom of the tank to form the dynamic mass of agglomerated solids clarified liquid effluent having a reduced solids content, preferably substantially free of solids, moves up through tank 12 within the mass of settled solids from the point of entry of the influent feed into the tank and moves above the level 50 of settled solids and overflows the top of the tank where it passes over either weir 51 located centrally in the tank or annular weir 53 attached to the upper portion of the inside of tank 12. Liquid effluent passes over weirs 51 and 53 and enters either inner annular overflow launder or channel 52 or outer annular overflow launder or channel 54 of weirs 51 and 53, respectively. Channels 52 and 54 are interconnected by connector pipe 56. Clarified liquid is then removed from the apparatus by an appropriate outlet means, such as conduit 58, which receives the clarified liquid.

Figure 5:
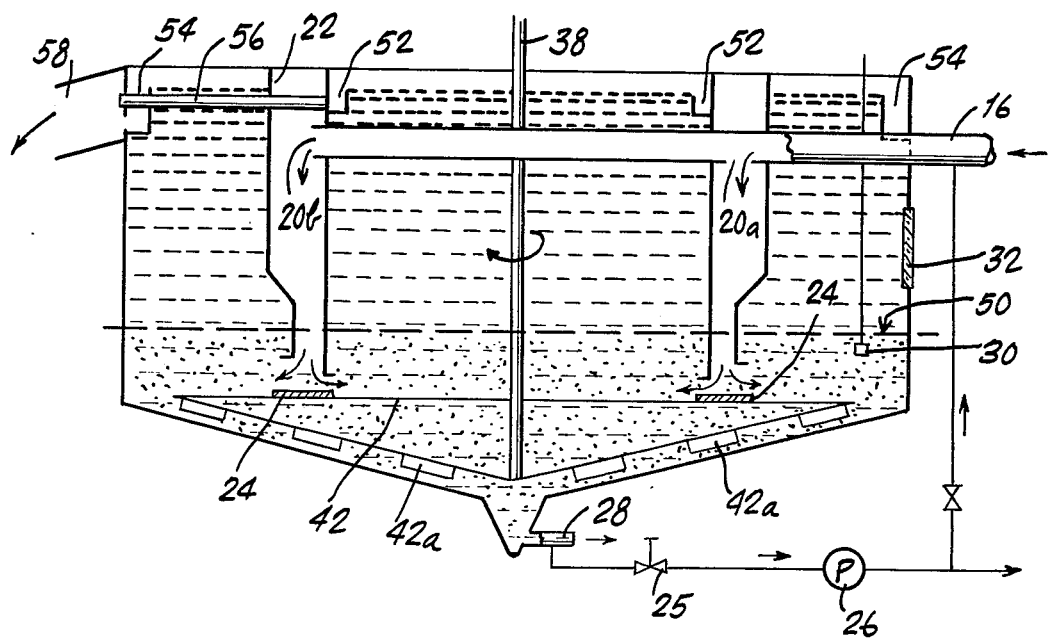
FIG. 5 is a schematic view of the apparatus.

FIG. 5 is a schematic representation of the operation of the apparatus of this invention and depicts influent feed entering influent pipe 16, agglomerating agent being added as the influent feed moves within pipe 16. The influent feed, now containing agglomerating solids, is conducted to outlets 20a and 20b of pipe 16 and introduced into the feedwell 22 for discharge into lower portion of the tank. Within the tank influent feed containing freshly agglomerating solid material is deflected radially outward and inward by concentric annular baffle plate 24 and mixed with previously agglomerating settled solids within the tank. Solids are removed through outlet means 28 and clarified effluent liquid is removed through outlet means 58. The settled solids which are removed from the bottom of the tank can, if desired, be reintroduced into influent pipe 16 to assist in solids agglomeration and then into the solids agglomerating settling zone within the tank to promote further agglomeration and settling of solids.

Figure 6:
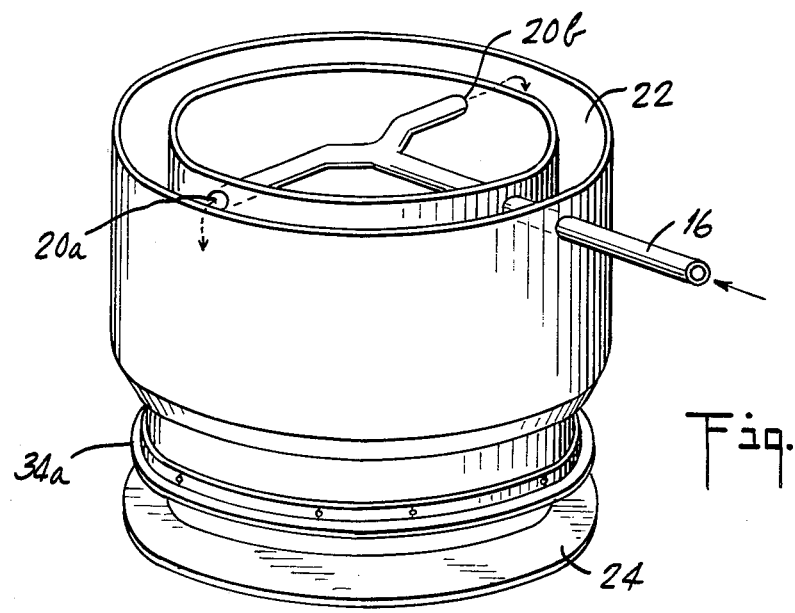
FIG. 6 is a perspective view of the annular feedwell with associated concentric annular baffle plate and influent pipe.

FIG. 6 is a perspective view of the annular feedwell 22 and an associated Y-branched influent pipe 16 to clearly show the manner in which influent feed enters the feedwell at outlets 20a and 20b. Also shown is the associated concentric annular baffle plate 24 and vertically slidably adjustable right-angled concentric annular outer sleeve 34a.

As will be apparent to those skilled in the art in the light of the foregoing disclosures, many modifications, alterations and substitutions are possible in the practice of this invention without departing from the spirit or scope thereof.

We claim:

1. A clarifier or thickener apparatus useful for separating solids from a liquid feed containing solids suspended therein comprising a tank for receiving said liquid feed, said tank being provided with a top liquid outlet means and a bottom solids outlet means, influent feed conduit means for supplying said liquid feed positioned closer to the top of said tank than to the bottom of said tank, annular feedwell means in fluid communication with said influent feed conduit means to receive said liquid feed, said annular feedwell means being positioned vertically within said tank such that the bottom of said annular feedwell means is closer to the bottom of said tank than to the top thereof, said annular feedwell means being open at the bottom thereof for the discharge into said tank of said liquid feed supplied to said annular feedwell means via said influent feed conduit means, said annular feedwell means having a larger annular cross-section at the upper portion thereof than at the lower portion thereof for the flow of said liquid feed introduced thereinto, said annular feedwell means comprising an inner shell or wall and an outer shell or wall, the bottom end of said inner shell or wall being flanged radially inwardly with respect to said tank and the bottom of said outer shell being flanged radially outwardly with respect to said tank, the bottom end of said inner shell of said annular feedwell means extending below the bottom end of the outer shell of said annular feedwell means, substantially horizontal baffle means positioned substantially concentric with respect to said annular feedwell means and commensurate with respect to the projected cross-sectional area of the open bottom of said annular feedwell means, said baffle means being fixed and positioned so as to be spaced from but directly opposed with respect to the open bottom of said annular feedwell means for arresting and diverting the flow of said liquid feed leaving the bottom of said annular feedwell means so that said liquid feed upon leaving the bottom of said annular feedwell means moves radially inwardly past the bottom flanged end of the inner shell of said annular feedwell means and radially outwardly within said tank with respect to the bottom flanged end of the outer shell of said annular feedwell means, the space available for the radial outward flow from the bottom of said annular feedwell means being greater than the space available for the radial inward flow of said liquid feed, and adjustable means for controlling the opening or distance between the open bottom of said annular feedwell means and said baffle means to control the discharge of said liquid feed from the open bottom of said annular feedwell means, said adjustable means to control the discharge of said liquid feed from the open bottom of said feedwell means comprising at least one vertically slidable flanged sleeve attached to the bottom of said feedwell means.

2. Apparatus in accordance with claim 1 which comprises rotatable rake means for gathering and conducting settled solids from the bottom of said tank to said bottom outlet means is provided within said tank positioned between the bottom of said annular feedwell means and the bottom of said tank.

3. Apparatus in accordance with claim 2 wherein said baffle means is attached to said rotatable rake means.

4. Apparatus in accordance with claim 1 wherein said baffle means is adjustable toward or away from the bottom of said annular feedwell means.

5. Apparatus in accordance with claim 1 wherein reagent supply means is provided in fluid communication with said influent feed conduit means for supplying reagent to said liquid feed within said influent feed conduit means.

6. Apparatus in accordance with claim 1 wherein reagent supply means is provided in fluid communication with said annular feedwell means supplying reagent to said liquid feed in said annular feedwell means.

7. Apparatus in accordance with claim 1 wherein means is provided associated within said tank for sensing the interface between a relatively dense fluid solids phase and clarified liquid phase within said tank.

8. Apparatus in accordance with claim 7 wherein said interface sensing means is associated with means operative to control the discharge of solids from said tank via said bottom solids outlet means.

9. An annular feedwell structure suitable for receiving and for radially inwardly and outwardly distributing liquid containing suspended solids comprising a closed continuous outer wall structure, a closed continuous inner wall structure, the upper ends of said outer and inner wall structures being coterminous, said inner wall structure being positioned substantially concentric with respect to and inwardly spaced from said outer wall structure, said inner and outer wall structures defining a top and bottom open-ended annular space or annulus therebetween, the bottom end of said inner wall structure extending below the bottom end of said outer wall structure, each of the ends of said outer and inner wall structures being radially flanged, the bottom end of the outer wall structure being radially outwardly flanged and the bottom end of the inner wall structure being inwardly flanged or in the opposite direction from the flange at the bottom end of said outer wall structure, a substantially horizontal flat baffle plate positioned directly beneath and spaced from the bottom ends of said wall structures, said baffle plate being commensurate in size relative to the projected cross-sectional area of the annular space or annulus defined by the bottom ends of said wall structures, the upper portion of the annulus defined by the inner and outer wall structures being greater in cross-sectional area than the lower portion of the annulus defined by said inner and outer wall structures, and adjustable means for controlling the opening or distance between the open bottom of said annular feedwell means and said baffle means to control the discharge of said liquid feed from the open bottom of said annular feedwell means, said adjustable means to control the discharge of said liquid feed from the open bottom of said feedwell means comprising at least one vertically slidable flanged sleeve attached to the bottom of said feedwell means.

10. A feedwell structure in accordance with claim 9 wherein means are provided for adjusting the space or distance between said baffle plate and the bottom ends of said wall structures.

11. A feedwell structure in accordance with claim 10 wherein said means for adjusting the space or distance between the bottom ends of said wall structures and said baffle plate are provided by and associated with said baffle plate.

* * * * *